(12) United States Patent
Hameiri

(10) Patent No.: US 11,007,038 B2
(45) Date of Patent: May 18, 2021

(54) APPARATUS FOR ACHIEVING MOLAR DISTALIZATION

(71) Applicant: Yoav Hameiri, Rehovot (IL)

(72) Inventor: Yoav Hameiri, Rehovot (IL)

( * ) Notice: Subject to any disclaimer, the term of this patent is extended or adjusted under 35 U.S.C. 154(b) by 0 days.

(21) Appl. No.: 15/313,844

(22) PCT Filed: May 27, 2015

(86) PCT No.: PCT/IL2015/050546
§ 371 (c)(1),
(2) Date: Nov. 23, 2016

(87) PCT Pub. No.: WO2015/181819
PCT Pub. Date: Dec. 3, 2015

(65) Prior Publication Data
US 2017/0196661 A1    Jul. 13, 2017

Related U.S. Application Data

(60) Provisional application No. 62/003,061, filed on May 27, 2014.

(51) Int. Cl.
*A61C 7/28* (2006.01)
*A61C 7/22* (2006.01)
*A61C 7/10* (2006.01)

(52) U.S. Cl.
CPC ............... *A61C 7/285* (2013.01); *A61C 7/10* (2013.01); *A61C 7/22* (2013.01); *A61C 7/282* (2013.01)

(58) Field of Classification Search
CPC ......... A61C 7/285; A61C 7/282; A61C 7/287; A61C 7/36; A61C 7/125; A61C 7/06; A61C 7/10; A61C 7/12; A61C 7/14; A61C 7/16; A61C 7/18; A61C 7/20; A61C 7/22; A61C 7/28; A61F 2/3099; A61F 2/0059; A61F 2/2803; A61F 2/2875; A61F 2/442; A61F 2/4611; A61F 2220/0025; A61F 2310/00023; A61F 2002/2835; A61F 2002/2878
USPC ................................ 623/17.16–17.18; 433/12
See application file for complete search history.

(56) References Cited

U.S. PATENT DOCUMENTS

| | | | | |
|---|---|---|---|---|
| 473,040 A | * | 4/1892 | Wilder | A61C 7/285 433/10 |
| 943,361 A | | 12/1909 | Mayer | |
| 1,014,030 A | * | 1/1912 | Angle | A61C 7/285 433/10 |
| 1,082,052 A | | 12/1913 | Strang | |
| 1,207,566 A | | 12/1916 | Koerbitz | |
| 1,471,785 A | * | 10/1923 | Fernald | A61C 7/282 433/12 |
| 2,927,578 A | * | 3/1960 | Gerbrands | A61C 7/10 433/7 |

(Continued)

*Primary Examiner* — Edward Moran
*Assistant Examiner* — Matthew P Saunders
(74) *Attorney, Agent, or Firm* — The Roy Gross Law Firm, LLC; Roy Gross

(57) ABSTRACT

A dental apparatus for achieving molar distalization, comprising a bracket for mounting on opposing molar teeth of a dental arch, and a dental arch wire. One end of the arch wire passes through one of a first bracket and the other end of the arch wire passes through the other of a second bracket. A worm gear adjustably fixes the position of each end of the arch wire within the bracket.

10 Claims, 10 Drawing Sheets

(56) References Cited

U.S. PATENT DOCUMENTS

| | | | | |
|---|---|---|---|---|
| 3,335,496 | A * | 8/1967 | Andrews | A61C 7/282 433/17 |
| 3,486,231 | A * | 12/1969 | Nelson | A61C 7/282 433/13 |
| 3,800,420 | A | 4/1974 | Ouaknine | |
| 4,171,568 | A * | 10/1979 | Forster | A61C 7/282 433/13 |
| 4,268,249 | A * | 5/1981 | Forster | A61C 7/02 433/10 |
| 4,468,196 | A * | 8/1984 | Keller | A61C 7/02 433/10 |
| 4,478,580 | A | 10/1984 | Barrut | |
| 4,553,934 | A | 11/1985 | Armstrong et al. | |
| 4,840,562 | A | 6/1989 | Wilson et al. | |
| 5,299,935 | A | 4/1994 | Lokar | |
| 5,439,377 | A * | 8/1995 | Milanovich | A61C 7/00 433/24 |
| 5,601,551 | A * | 2/1997 | Taylor | A61B 17/66 606/53 |
| 5,700,263 | A * | 12/1997 | Schendel | A61B 17/663 606/57 |
| 5,885,283 | A * | 3/1999 | Gittleman | A61C 7/10 433/7 |
| 6,062,854 | A * | 5/2000 | Pozzi | A61C 7/10 433/7 |
| 6,139,316 | A * | 10/2000 | Sachdeva | A61B 17/6433 606/105 |
| 6,322,566 | B1 * | 11/2001 | Minoretti | A61B 17/663 606/105 |
| 6,589,250 | B2 * | 7/2003 | Schendel | A61B 17/663 433/7 |
| 6,918,915 | B2 * | 7/2005 | Koseki | A61B 17/663 433/7 |
| 7,306,458 | B1 | 12/2007 | Lu | |
| 8,808,290 | B2 * | 8/2014 | Dubois | A61B 17/663 606/58 |
| 2003/0170585 | A1 * | 9/2003 | Wilkerson | A61B 17/663 433/7 |
| 2009/0065070 | A1 * | 3/2009 | Jaehyun | F16L 41/06 137/318 |
| 2009/0186314 | A1 * | 7/2009 | Pober | A61C 7/22 433/17 |
| 2010/0152734 | A1 * | 6/2010 | Mulone | A61B 17/663 606/60 |

* cited by examiner

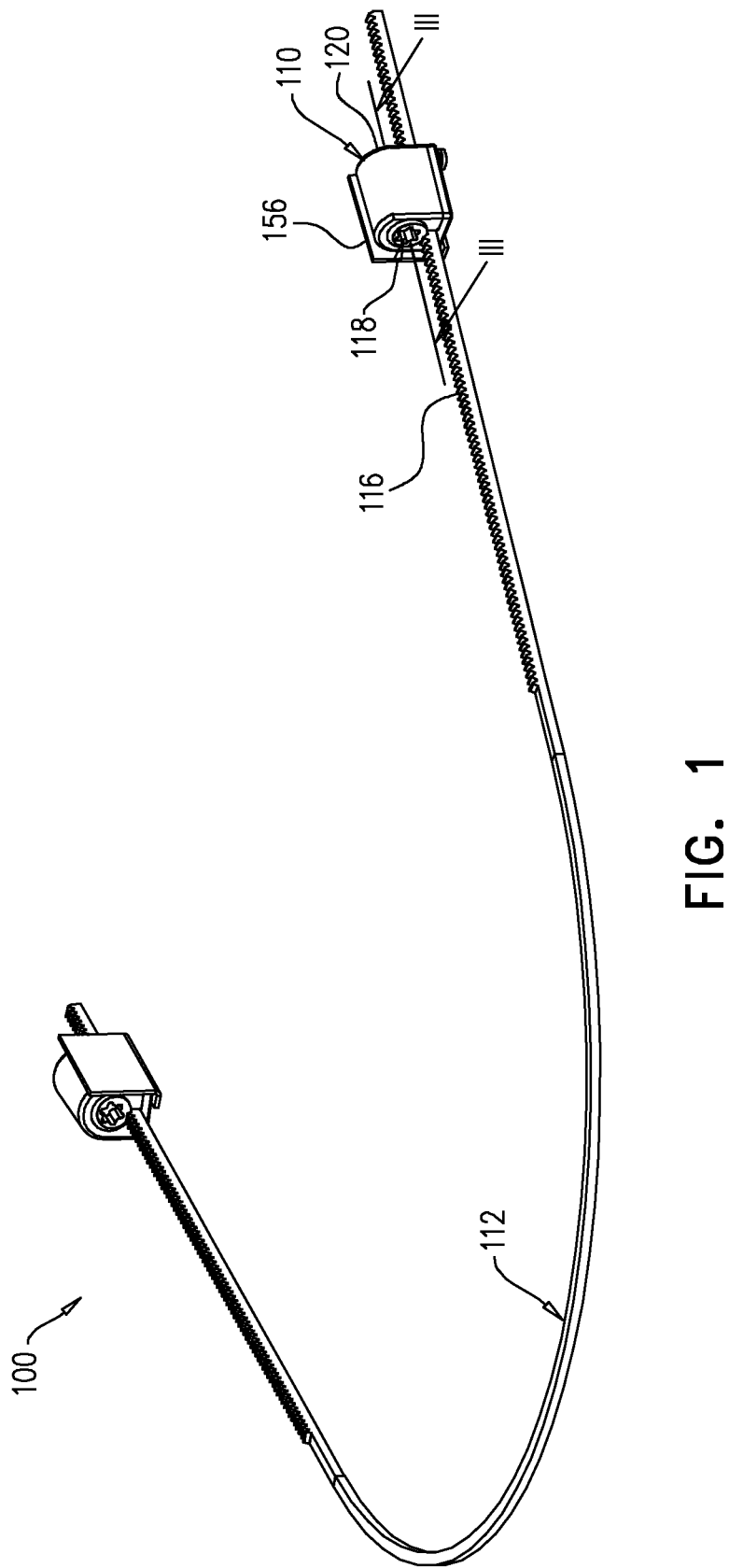

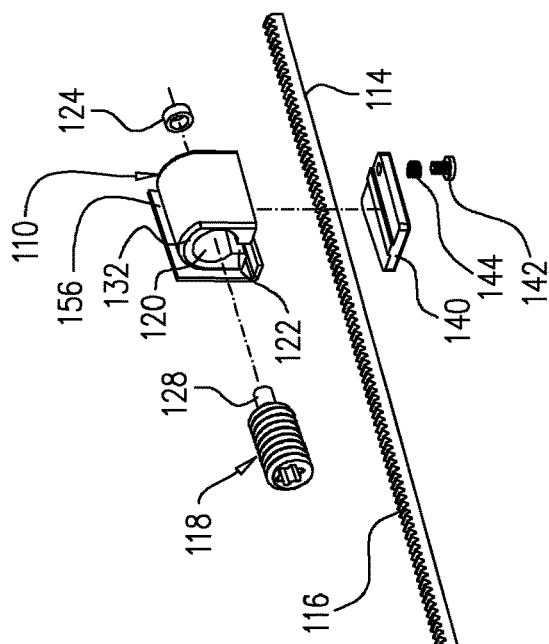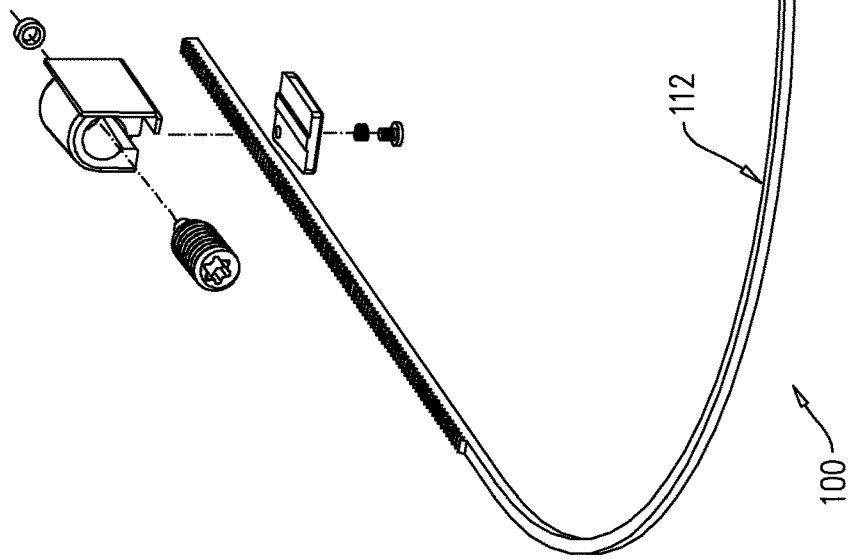
FIG. 2a

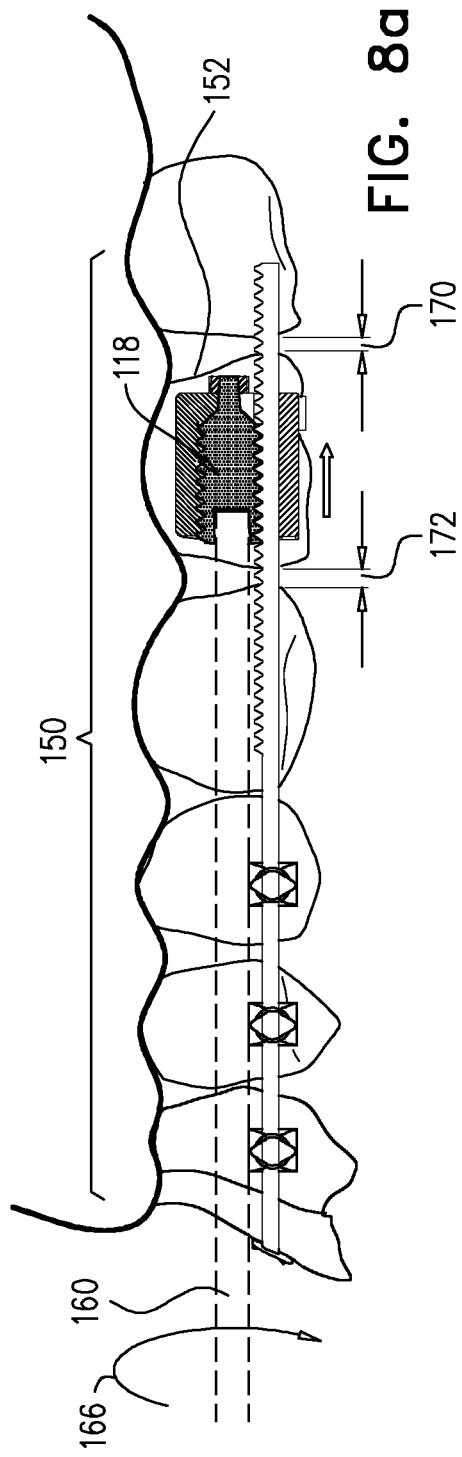
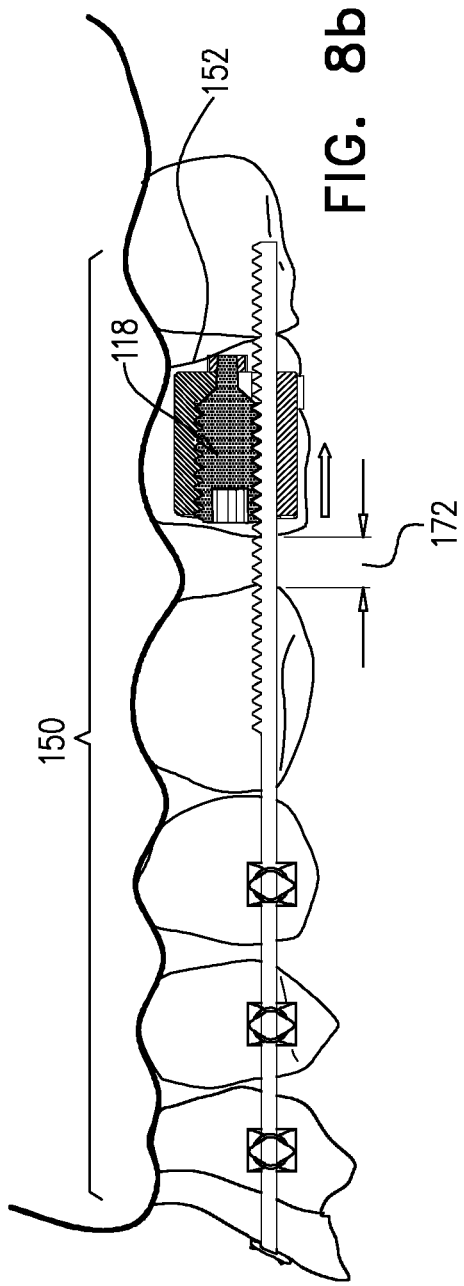

APPARATUS FOR ACHIEVING MOLAR DISTALIZATION

RELATED APPLICATIONS

This application is a 371 application of PCT Patent Application No. PCT/IL2015/050546 having International filing date of May 27, 2015, which claims the benefit of priority of U.S. Patent Application No. 62/003,061 filed on May 27, 2014. The contents of the above applications are all incorporated by reference as if fully set forth herein in their entirety.

FIELD OF THE INVENTION

The present invention relates to the field of orthodontics. In particular, the present invention relates to a corrective orthodontic technique known as molar distalization. More particularly, the present invention relates to an improved orthodontic apparatus for achieving molar distalization.

BACKGROUND OF THE INVENTION

Malocclusion of the teeth is a common occurrence, which, in severe cases, is often treated with orthodontics (i.e. braces) in order to correct the problem and properly align the teeth. The components of a typical set of braces include brackets bonded to the teeth, arch wire running through each bracket, metal bands mounted on the molar teeth for securing the ends of the arch wire brackets mounted to the bands. Commonly, hooks extend from the brackets to support rubber bands, and headgear tubes mounted on the bands extend therefrom for securing headgear thereto.

When treating malocclusion with braces, the initial stage requires the leveling of the teeth in order to ensure that the arch wire runs essentially straight through the braces. Following the leveling, one technique that is used by orthodontic practitioners is known as, "molar distalization", whereby the molars are moved from class 2 (malocclusion) to class 1 (normal occlusion). By moving the molars in a distal direction a space is created, which allows the other teeth to be repositioned in the mouth. In some cases, known as class 3 (mesiocclusion) the upper teeth must be moved in the mesial direction in order to achieve a class 1 occlusion.

Traditionally, in order to accomplish molar distalization, a metal band is mounted on both second molars of the upper arch (or lower arch). A plate and external headgear are connected to the bands via springs and/or rubber bands, which, over time provide the force necessary to distally shift the molars and thereby create a space between the adjacent teeth in order to correct the malocclusion.

The headgear and other custom made appliances, such as a plate, are typically used, which can require fitting and sending molds to a laboratory for fabrication. These components are unsightly for the patient and can increase the waiting time that is necessary prior to commencing treatment. Moreover, successful treatment is dependent on patient cooperation, which, particularly with younger patients, might not be readily provided.

SUMMARY OF THE INVENTION

Accordingly, it is a principal object of the present invention to provide a dental apparatus that overcomes the difficulties and drawbacks associated with the prior art, wherein the apparatus comprises a bracket for mounting on opposing molar teeth of a dental arch; a dental arch wire, wherein one end of the arch wire passes through one of the brackets and the other end of said arch wire passes through the other of the brackets; and, a worm gear for adjustably fixing the position of each end of the arch wire within the bracket.

Optionally, the bracket is mounted on a tooth by adhesive material. The bracket is optionally joined to a dental band and the dental band is wrapped around a tooth.

The arch wire comprises an array of teeth extending from each end along a portion of the wire.

Preferably, the worm gear comprises a helically threaded screw.

The bracket comprises a housing for receiving the worm gear, and a channel for passing the dental arch wire therethrough. The worm gear is preferably rotatably fixed within the housing of the bracket.

The teeth of the arch wire engage with the threading of the worm gear such that the rotation of the worm gear results in the linear movement of the arch wire.

The invention preferably further comprises a driving tool for rotating the worm gear.

Preferably, the bracket comprises a cover for selectively opening and closing the open outer longitudinal length of the channel. While the cover is in the open position the end of the arch wire is inserted transversely at a predetermined longitudinal position within the channel. While the cover is in the closed position and the end of the arch wire is disposed within the channel, the arch wire is movable through the channel along a linear path.

BRIEF DESCRIPTION OF THE FIGURES

To accomplish the above and related objects, the invention may be embodied in the form illustrated in the accompanying drawings, attention being called to the fact, however, that the drawings are illustrative only, and that changes may be made in the specific construction illustrated and described.

FIG. 1 shows a perspective assembled view of the apparatus of the present invention;

FIGS. 2a and 2b show a front exploded view (FIG. 2a) and a rear exploded view (FIG. 2b) of the apparatus of the present invention;

DETAILED DESCRIPTION OF THE PREFERRED EMBODIMENTS

Figure 2B:
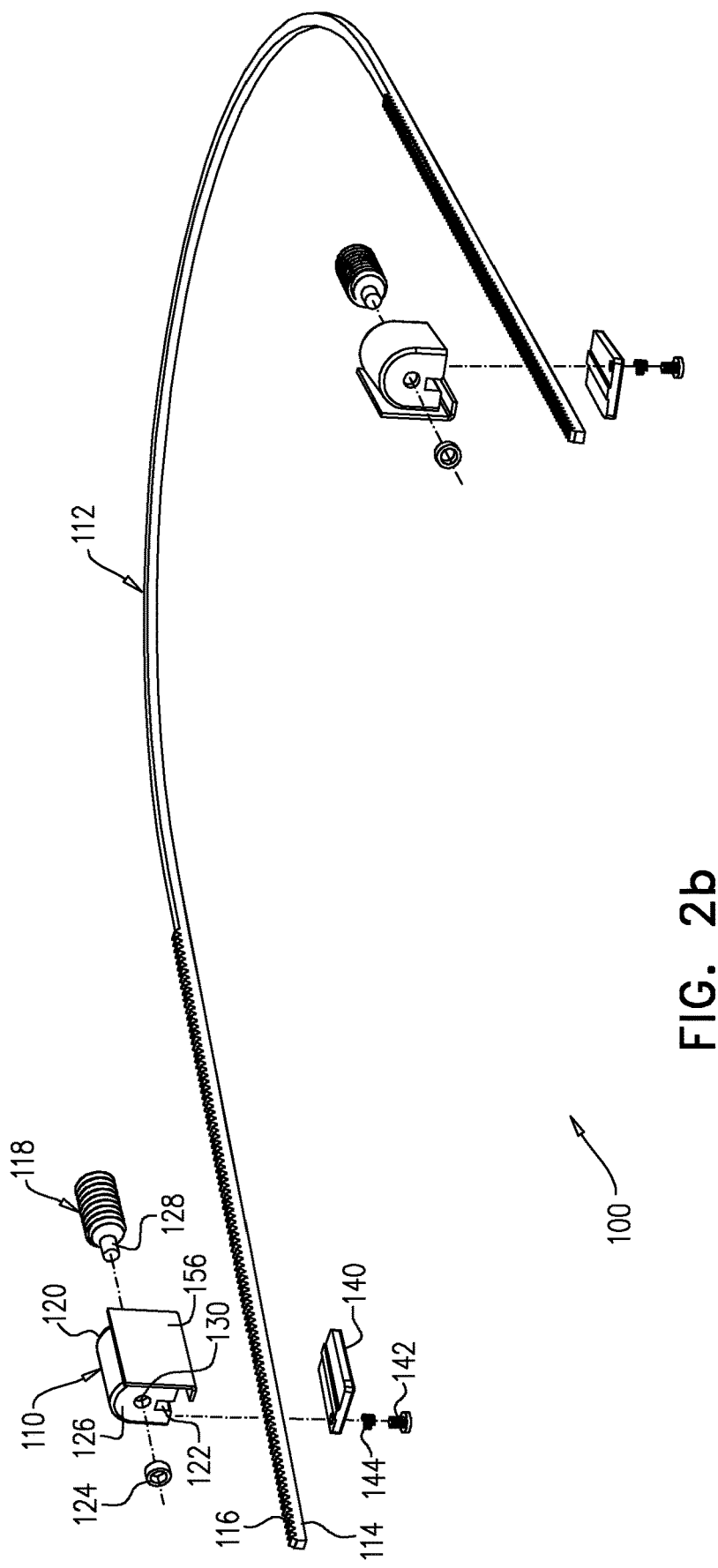

A first preferred embodiment of the apparatus of the present invention for achieving molar distalization is shown in FIG. 1 in a perspective assembled view, and in FIGS. 2a and 2b in a front exploded view (FIG. 2a) and a rear exploded view (FIG. 2b), and designated generally by numeral (100). With reference to FIGS. 1, 2a and 2b, apparatus (100) comprises a bracket (110) for mounting on a molar tooth of a dental arch as shown and described herein below, but not shown in these figures, a dental arch wire (112) having an end portion (114), comprising an array of teeth (116), for positioning within bracket (110), and a worm gear (118) for engaging with teeth (116) and selectively positioning end portion (114) of arch wire (112) within bracket (110).

It is important to note that the two brackets shown in each of the figures are identical mirror images of each other, whereby one bracket is intended for mounting on a right molar tooth and the other bracket is intended for mounting on a left molar tooth. The description herein refers to only one bracket, and it is understood that the other bracket shown in the figures comprises identical components, mutatis mutandis. Similarly, although each arch wire end is positioned within a respective bracket, the description herein relates to only one end (114), which is positioned within bracket (110) described herein, and it is understood that the function and structure of the other end of arch wire (112) is identical to that of the end described herein, mutatis mutandis.

Figure 3:
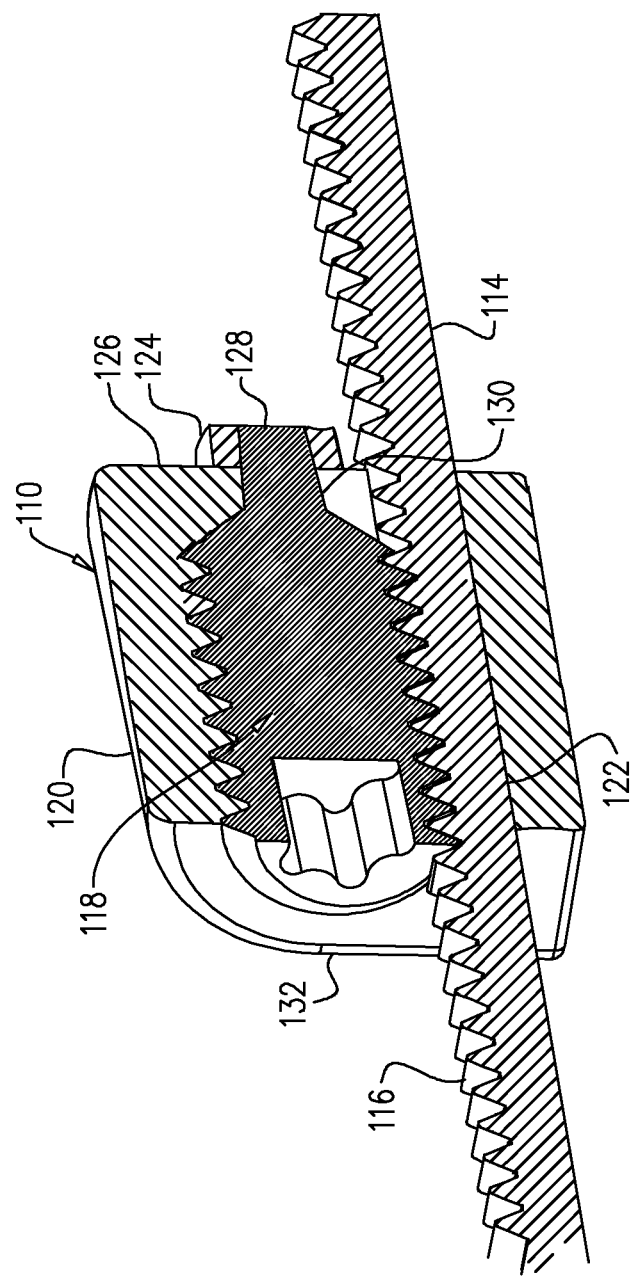
FIG. 3 shows a perspective cross-sectional view of the bracket and a portion of the arch wire of the present invention, taken along III-III of FIG. 1.

Referring particularly to FIGS. 2a and 2b, as well as to FIG. 3 showing a perspective cross-sectional view of assembled bracket (110) taken along III-III of FIG. 1, bracket (110) comprises a housing (120) for accommodating worm gear (118), and a channel (122) through which end portion (114) travels longitudinally. Distal tip (128) of worm gear (118) protrudes through an opening (130) in distal end (126) of bracket (110). Ring (124) is positioned around distal tip (128) and affixed thereto, for preventing worm gear (118) from exiting bracket (110) at the proximal end (132) of bracket (110). Distal tip (128) is freely rotatable within opening (130) to allow worm gear (118) to rotate, as described herein below.

Although not shown in the figures, in an alternative embodiment the worm gear is positioned externally to the bracket, such as on the medial or distal side of the bracket.

Figure 4A:
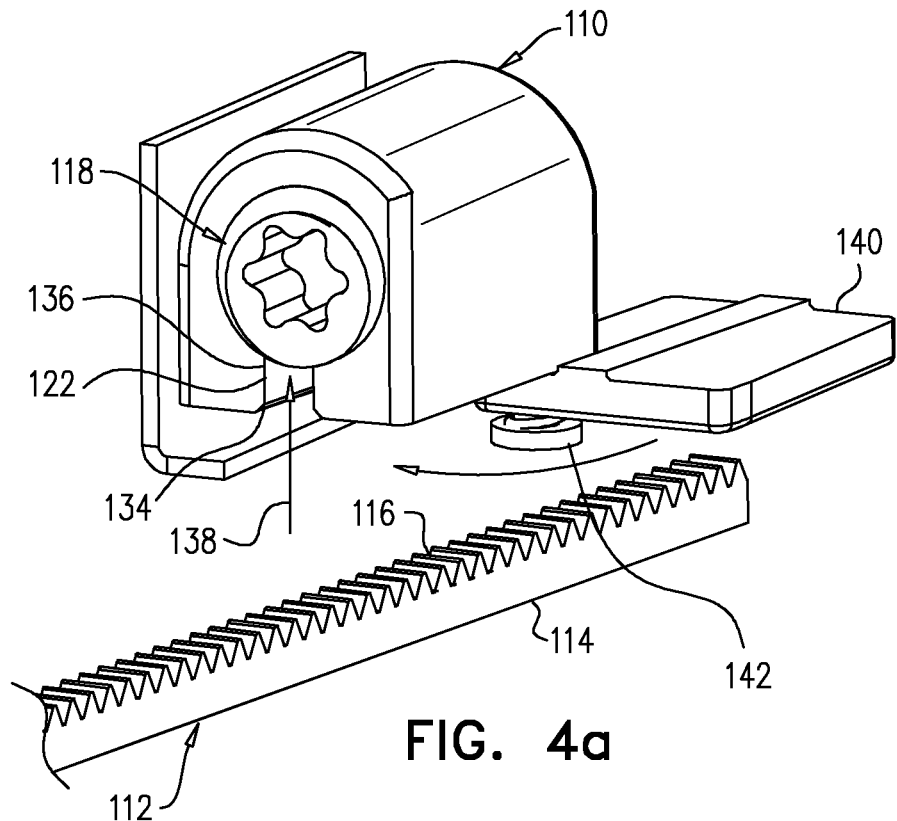
FIGS. 4a and 4b show an enlarged front perspective view of the bracket of the present invention with the arch wire spaced apart from the bracket prior to insertion into channel (FIG. 4a) and with the arch wire assembled with the bracket (FIG. 4b)
Figure 4B:
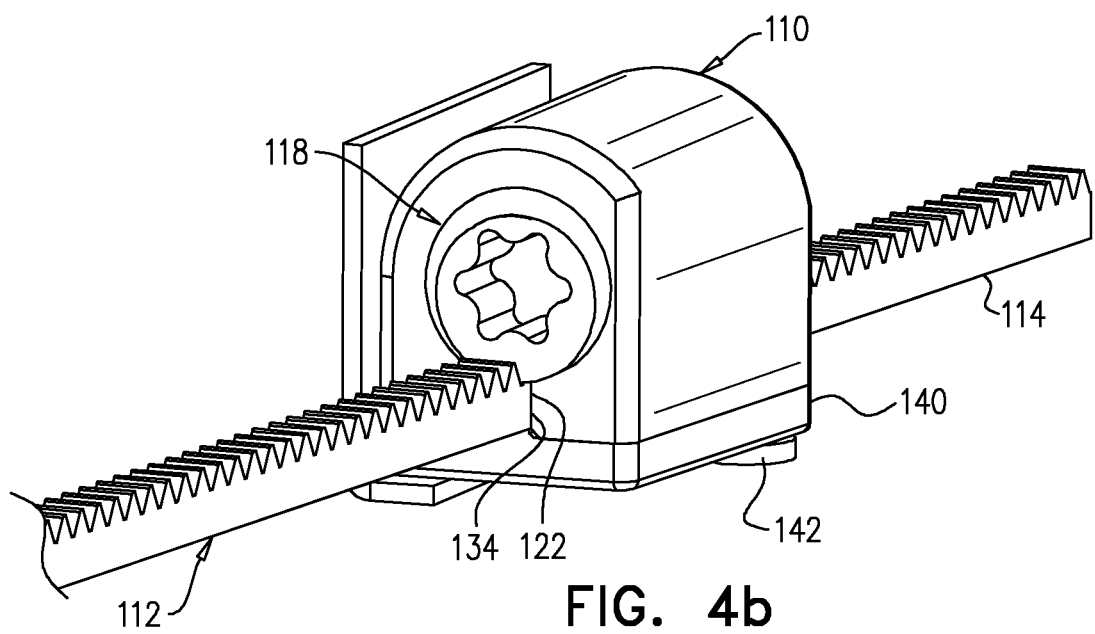

An enlarged front perspective view of bracket (110) is shown in FIG. 4a, with worm gear (118) assembled therein, but with arch wire (112) spaced apart from bracket (110) prior to insertion into channel (122). Channel (122) comprises an elongated slot, open along both opposing longitudinal lengths (134), (136). End portion (114) is initially inserted transversely into channel (122) through first longitudinal opening (134) as indicated by arrow (138), while cover (140) is connected to bracket (110), in an open position. Cover (140) is rotatable about spring loaded screw (142) as indicated in the figures. Spring (144) is best seen in FIGS. 2a and 2b. After insertion of end portion (114) within channel (122), teeth (116) of end portion (114) engage with worm gear (118) through second longitudinal opening (136), as best seen in FIG. 3. Referring to FIG. 4b, after insertion of end portion (114) within channel (122), cover (140) is rotated to the closed position to enclose longitudinal opening (134) and is secured in place via screw (142), for preventing arch wire (112) from sliding transversely out of channel (122).

Channel (122) is also open at each longitudinal end (152), (148) through which arch wire (112) travels longitudinally when linearly shifted by worm gear (118), as described further, herein below.

Figure 4C:
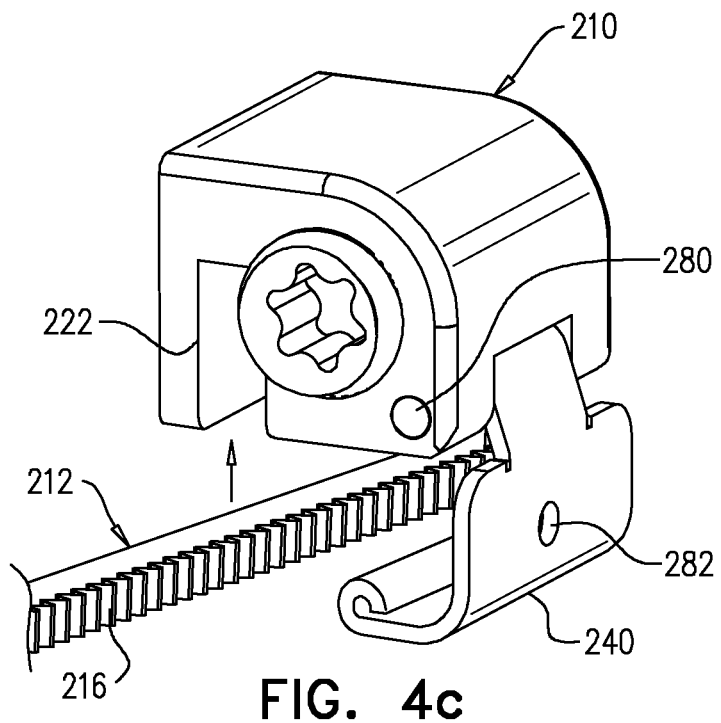
FIGS. 4c and 4d show an alternative embodiment of the bracket of the present invention in similar views as that of FIGS. 4a and 4b, with an alternative embodiment of the cover in an open position (Fig. c) and a closed position (FIG. 4d)
Figure 4D:
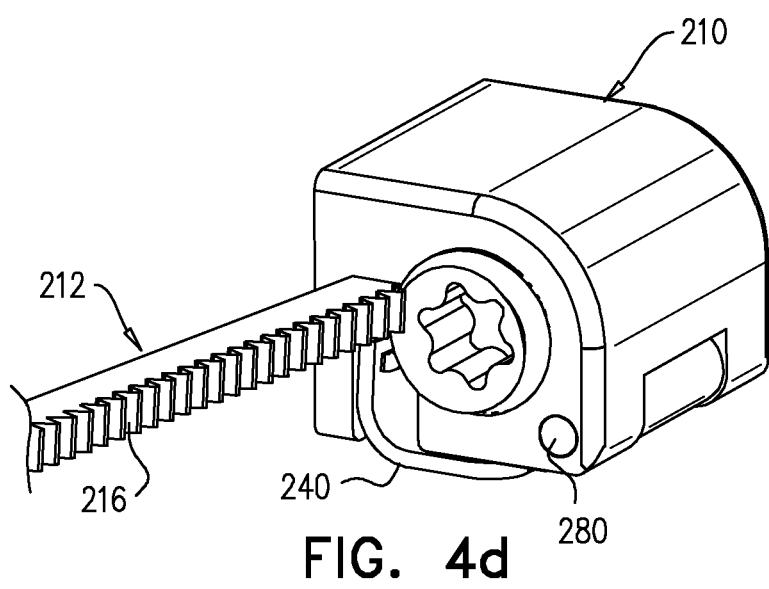

FIGS. 4c and 4d show an alternative embodiment of bracket (210), similar to the views shown in FIGS. 4a and 4b, whereby cover (240) is hingedly rotatable to bracket (210) and arch wire (212) is inserted into channel (222) with teeth (216) facing buccal direction. Cover (240) is secured to bracket (210) via spring loaded lock (280). Additionally or alternatively, a screw is inserted through opening (282) in cover (240) to secure cover (240) in the closed position.

Figure 5A:
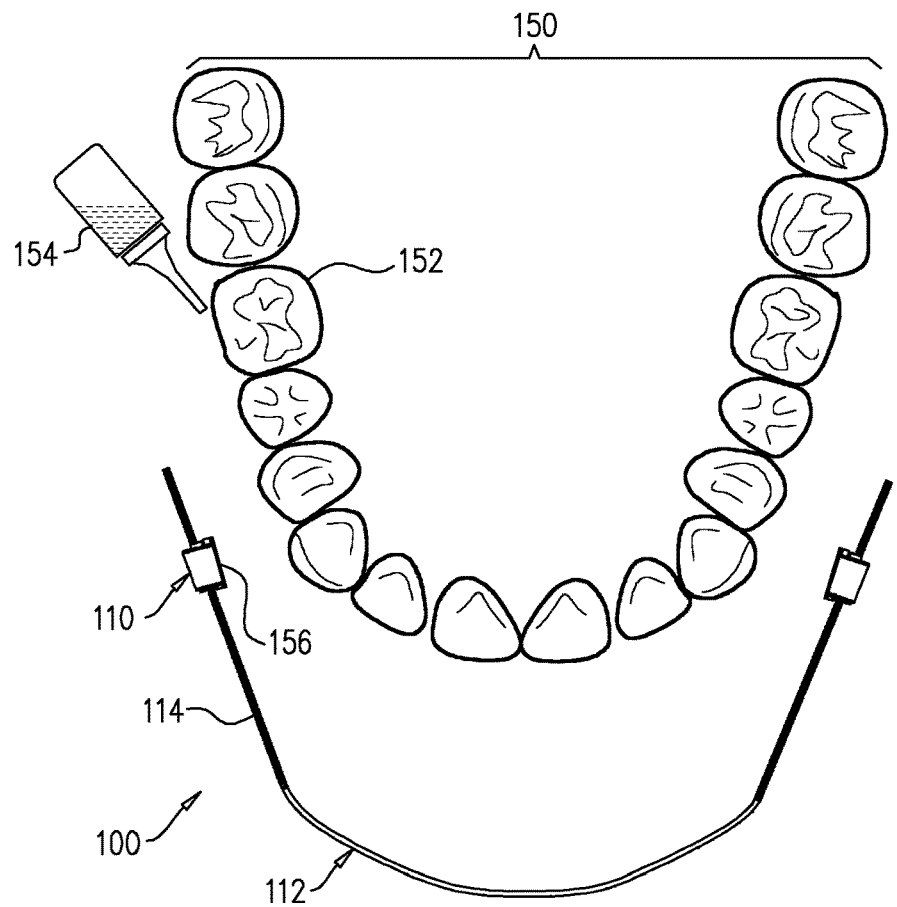
FIGS. 5a and 5b show an underside view of a dental arch with one method of mounting the bracket of the present invention on teeth, using an adhesive agent.
Figure 5B:
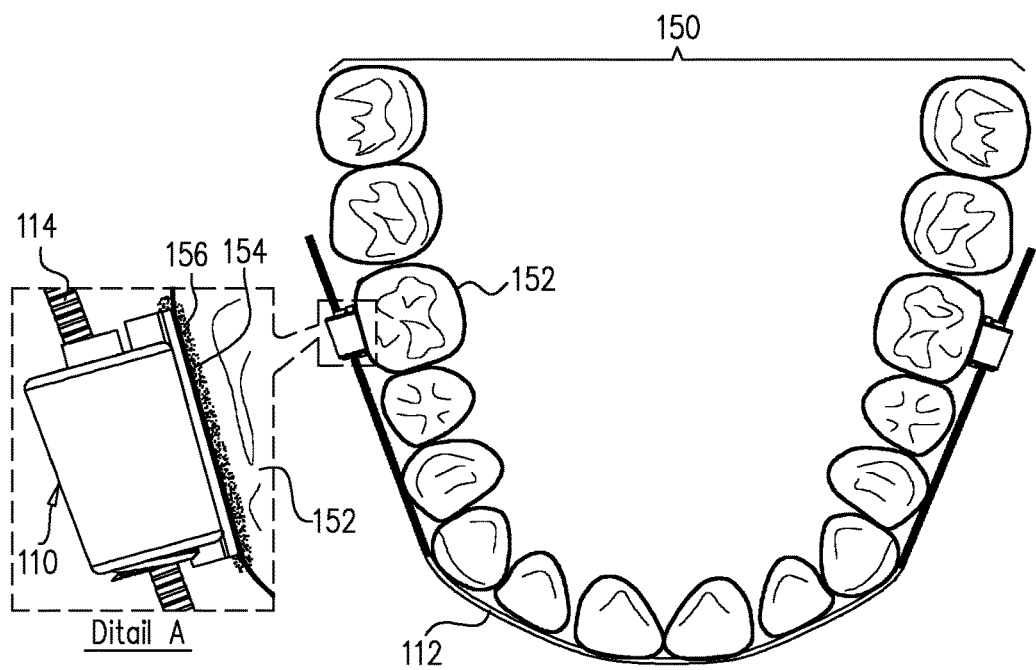

An underside view of a dental arch (150) along with an underside view of the assembled apparatus (100) of the present invention are shown in FIGS. 5a and 5b, illustrating a first preferred method for mounting bracket (110) on a tooth (152). An adhesive material (154) is used to bond side wall (156) of bracket (110) to the buccal side of a third molar tooth (152), although bracket (110) may be bonded to another tooth as desired.

FIG. 5a shows adhesive material (154) being applied to the desired tooth (152), where apparatus (100) is spaced apart from dental arch (150) in preparation for mounting on tooth (152). FIG. 5b and enlarged Detail A show the point of contact where bracket (110) is bonded to tooth (152).

Figure 6A:
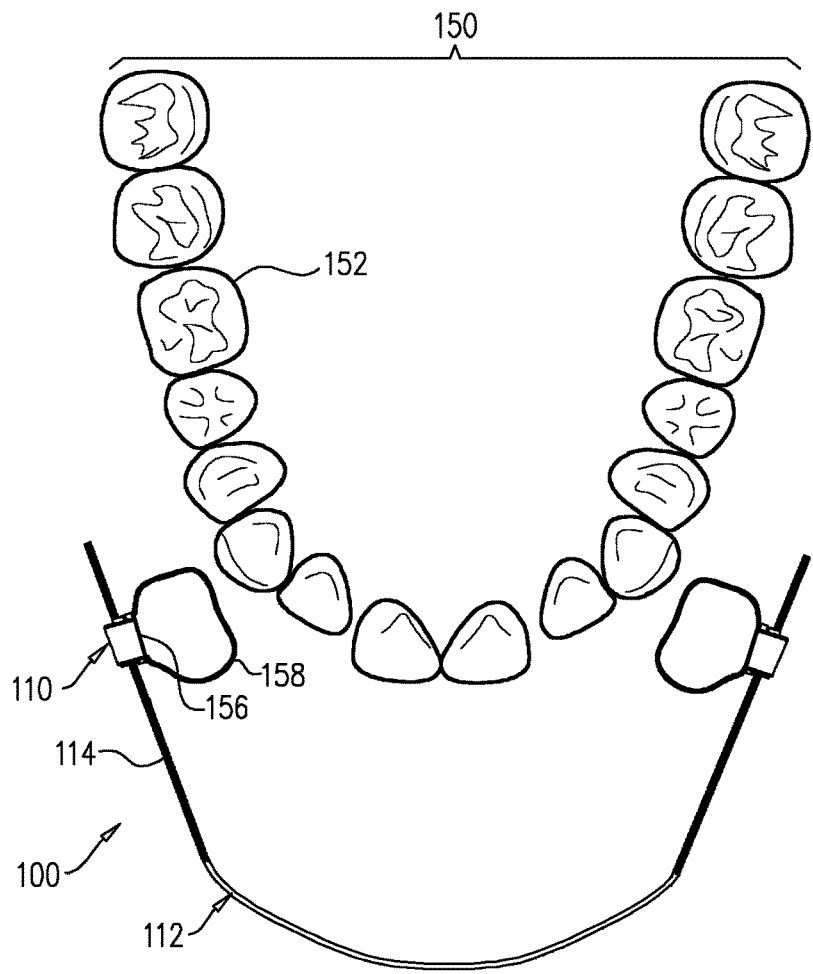
FIGS. 6a and 6b show an underside view of a dental arch with another method of mounting the bracket of the present invention on teeth, using a dental band.
Figure 6B:
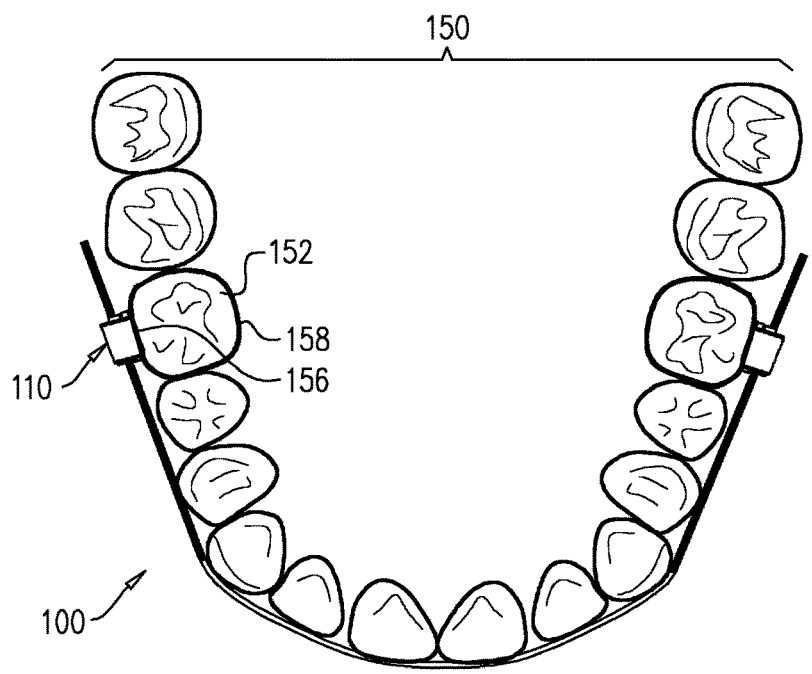

A second preferred method for mounting bracket (110) on a tooth (152) is shown in FIGS. 6a and 6b, whereby a dental band (158) is integrally joined with side wall (156) of bracket (110). FIG. 6a shows apparatus spaced apart from dental arch (150) in preparation for mounting on tooth (152). FIG. 6b shows dental band (158) wrapped around tooth (152).

Figure 7A:
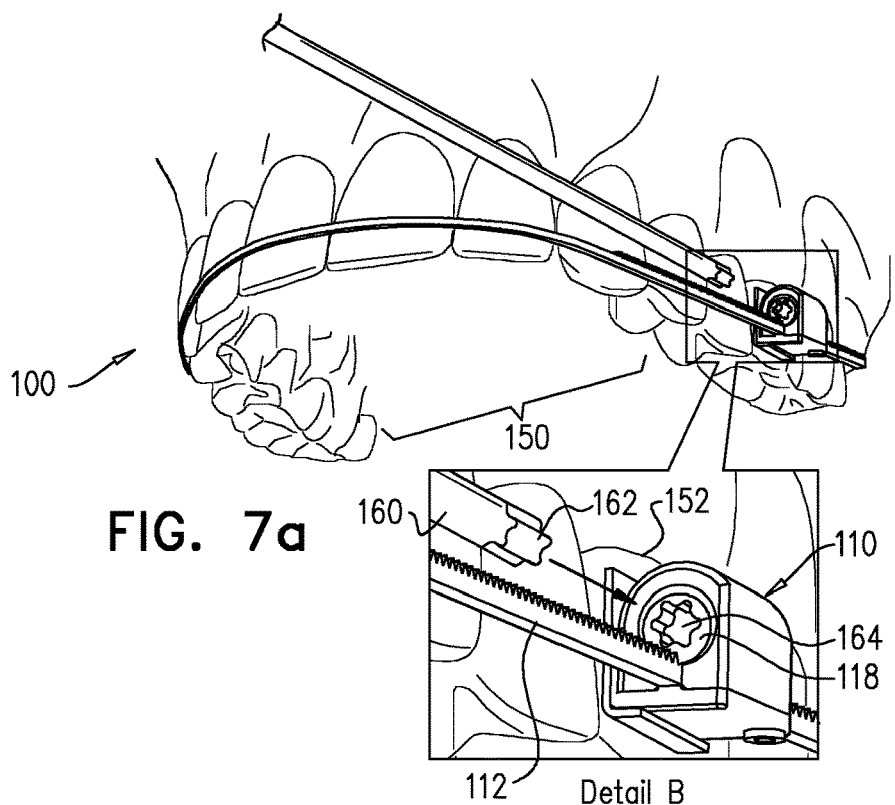
FIGS. 7a and 7b show a bottom perspective view of the present invention positioned around a dental arch, with the driving tool spaced apart from the worm gear (FIG. 6a), and engaged with the worm gear (FIG. 6b); and, FIGS. 8a and 8b show a side view of the apparatus of the present invention positioned around a dental arch and a driving tool coupled with the bracket prior to rotation of the driving tool (FIG. 8a) and post rotation of the driving tool (FIG. 8b).
Figure 7B:
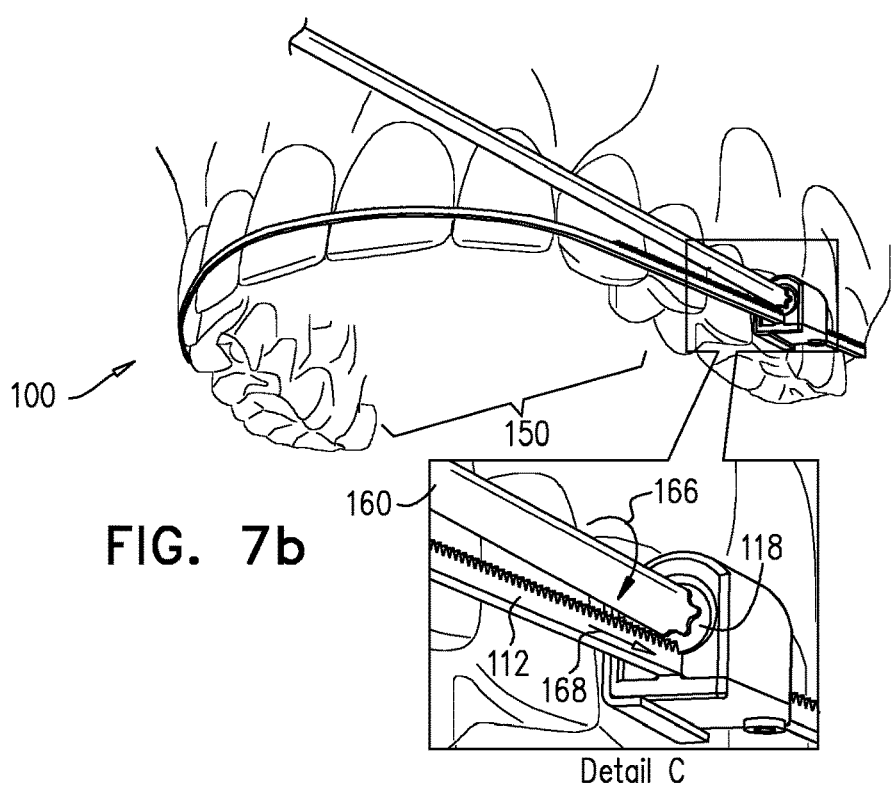

Referring to FIG. 7a, apparatus (100) is shown assembled in a bottom perspective view positioned around dental arch (150). As best seen in enlarged Detail B in FIG. 7a, bracket (110) is bonded to tooth (152). A driving tool (160), such as a screw driver, with a suitable head (162) for coupling with the head (164) of worm gear (118) is shown spaced apart from worm gear (118). FIG. 7b and enlarged Detail C are essentially identical views as that of FIG. 7a and Detail B respectively, but with driving tool (160) coupled with worm gear (118). Arrow (166) indicates the rotation of driving tool (160), and in turn the rotation of worm gear (118) in a clockwise direction. Upon rotation of worm gear (118) arch wire (112) is shifted along a linear plane. Thus, for example, if worm gear (118) is rotated in the clockwise direction then arch wire (112) moves distally, and if worm gear (118) is rotated in the counter clockwise direction then arch wire (112) moves proximally. Arrow (168) indicates linear movement of arch wire (112) in the distal direction.

As an illustrative example of the effect that the apparatus (100) of the present invention has on the teeth of the dental arch around which apparatus (100) is positioned, FIG. 8a shows a side view of dental arch (150) of FIG. 7b, with apparatus (100) positioned around dental arch (150) and driving tool (160) (shown via dotted lines) coupled with worm gear (118). Rotation of driving tool (160) in a clockwise direction is indicated by arrow (166) as in FIG. 7b. Gaps (170) and (172) between respective adjacent teeth are shown present in FIG. 8a, prior to the rotation. FIG. 8b shows the same view as that of FIG. 8a, but post rotation of driving tool (160), whereby gap (170) of FIG. 8a is reduced, and gap (172) of FIG. 8a is enlarged, thereby achieving molar distalization. A comparison between the location of incisors teeth (174) in FIG. 8a and of the same incisor teeth (174) in FIG. 8b illustrates the effect of molar distalization.

It is understood that the above description of the embodiments of the present invention are for illustrative purposes only, and is not meant to be exhaustive or to limit the invention to the precise form or forms disclosed, as many modifications and variations are possible. Such modifications and variations are intended to be included within the scope of the present invention as defined by the accompanying claims.

The invention claimed is:

1. An apparatus for achieving molar distalization, said apparatus comprising:
   a. two brackets for mounting one of each on opposing molar teeth of a dental arch, each of said brackets comprising a housing and a channel;
   b. one dental arch wire having two ends, wherein one end of said arch wire is positioned through one of said channels in one of said brackets and the other end of said arch wire is positioned through the other of said channels in the other of said brackets; and
   c. two rotatable worm gears, each comprising a helically threaded screw portion, said helically threaded screw portion being entirely enclosed within, and prevented from exiting from one of each of said housings, wherein the position of one of each of said ends of said arch wire is adjustably fixable within one of each of said brackets by rotating at least one of each of said worm gears,
   wherein the arch wire comprises an array of teeth extending from each end along a portion of the wire, and
   wherein the teeth of the arch wire engage with the threading of the worm gear and when rotating the worm gear linear movement of the arch wire results.

2. The apparatus according to claim 1, wherein each bracket is for mounting on a tooth by adhesive material.

3. The apparatus according to claim 1, wherein each bracket is joined to a dental band, wherein each of said dental bands is for wrapping around a tooth.

4. The apparatus according to claim 1, wherein each worm gear comprises a helically threaded screw.

5. The apparatus according to claim 4, wherein the worm gear is rotatably fixed within the housing of the bracket.

6. The apparatus according to claim 1, further comprising a driving tool for rotating each worm gear.

7. The apparatus according to claim 4, wherein each bracket further comprises a cover for selectively shifting between an open position and a closed position, for opening and closing the open outer longitudinal length of the channel of the bracket.

8. The apparatus according to claim 7, wherein while the cover is in the open position one end of the arch wire is inserted transversely at a predetermined longitudinal position within the channel.

9. The apparatus according to claim 7, wherein while the cover is in the closed position and one end of the arch wire is disposed within the channel, the arch wire is movable through the channel along a linear path.

10. An apparatus for achieving molar distalization, said apparatus comprising:
    a. two brackets, for mounting one of each on opposing molar teeth of a dental arch, wherein each of said brackets comprises a housing and a channel;
    b. one dental arch wire having two ends, wherein one end of said arch wire is positioned through one of said channels in one of said brackets and the other end of said arch wire is positioned through the other of said channels in the other of said brackets; and,
    c. two rotatable worm gears, one of each comprises a helically threaded screw portion, said helically threaded screw portion being entirely enclosed within one of each of said housings, wherein the position of one of each of said ends of said arch wire is adjustably fixable within one of each of said brackets by rotating at least one of each of said worm gears,
    whereby each of said worm gears comprises a distal tip, and each of said brackets comprises an opening through which said one of each of said distal tips protrudes,
    wherein a ring is positioned around each of said protruding distal tips for preventing each of said helically threaded screw portions from exiting from said housing in which it is enclosed.

* * * * *